P. S. BAILEY.
HEAD AND FLOOD LIGHT.
APPLICATION FILED MAY 13, 1916.
1,326,014.
Patented Dec. 23, 1919.
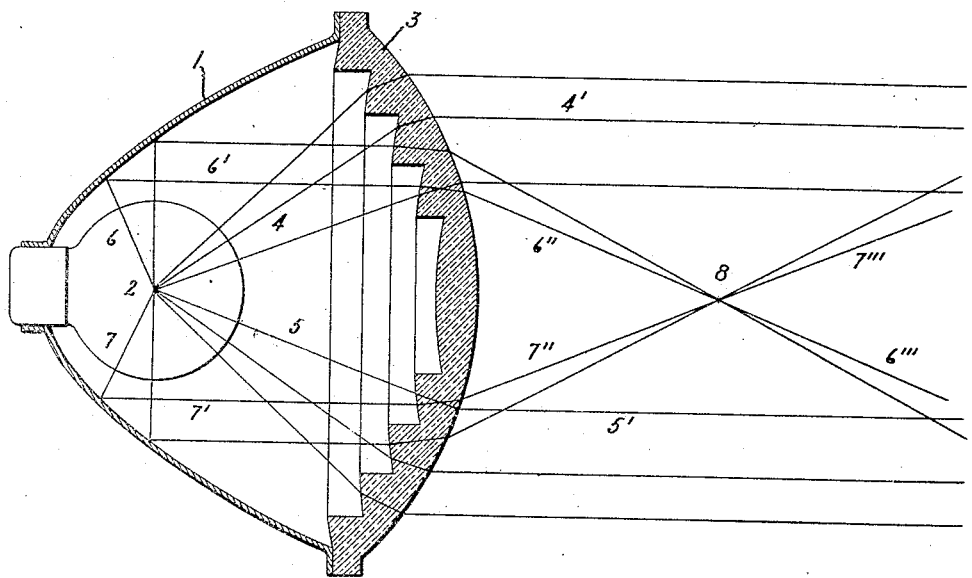
Inventor:
Percy S. Bailey,
by
His Attorney.

ial sc# UNITED STATES PATENT OFFICE.

PERCY S. BAILEY, OF SWAMPSCOTT, MASSACHUSETTS, ASSIGNOR TO GENERAL ELECTRIC COMPANY, A CORPORATION OF NEW YORK.

HEAD AND FLOOD LIGHT.

1,326,014.  Specification of Letters Patent.  Patented Dec. 23, 1919.

Application filed May 13, 1916. Serial No. 97,427.

*To all whom it may concern:*

Be it known that I, PERCY S. BAILEY, a citizen of the United States, residing at Swampscott, in the county of Essex and State of Massachusetts, have invented certain new and useful Improvements in Head and Flood Lights, of which the following is a specification.

My invention has reference to improvements in headlights or flood lights, the object being to obtain a wide field of light with dominating intensity in and about the center which gradually diminishes and finally fades away as it recedes from the center. I attain this object by combining with the source of light a parabolic reflector with a condensing lens, the source of light being a rather concentrated one and located in the common focus of the reflector and of the lens. I have found that if a condensing lens alone is used, with the source of light in its focus, the beam of light issuing from the apparatus, though strong, covers only a comparative narrow field, and this, for many purposes, is found objectionable; but if in addition to the condensing lens there is also a reflector of the parabolic kind with the source of light in its focus, the reflected rays striking the condensing lens in parallel lines are refracted by the latter so as to converge and then diverge beyond the apparatus, and these diverging rays cover a field that is so much the wider as the distance of the apparatus from the object to be illuminated increases, and the parts more remote from the center of the field are illuminated with gradually diminishing intensity. This effect has been found to be highly valuable both for headlights and flood lighting. By preference I use a Fresnel lens, but any other condensing lens may be used although the Fresnel lens I have found to be particularly effective.

In the accompanying drawing which illustrates one form which my invention may assume, there is shown an axial section of the combined reflector and lens and the source of light is indicated in its proper position.

Referring to the drawing, the reflector 1 is a paraboloid and in its focus 2 is a source of light which in the drawing is indicated as an incandescent lamp, although any other suitable source of light may be used. The opening of the reflector is closed by the lens 3, which I have here shown as a semaphore or Fresnel lens. The radii of curvature of the lens, the distance of the lens from the source of light and the relative positions of reflector and lens are such that their axes and foci coincide. This brings the source of light into the common focus of the reflector and lens.

The effect of this arrangement is that all rays from the source which strike the lens directly, such as the rays 4, 5, are refracted by the lens so as to issue in parallel rays 4', 5', and the aggregate of these parallel rays give an intense but unduly concentrated field. But the rays, which from the source of light reach the reflector, such for instance, as the rays 6, 7, are reflected as parallel rays 6', 7', which, striking the lens are by the same refracted in the directions 6" and 7" to converge at the focus 8 on the right hand side of the lens, and from this point they again diverge as indicated at 6''', 7''' and thus cover a wide field which, as it expands from the center gradually diminishes in luminous intensity and thus gives the result aimed at.

When this arrangement is used for headlights it not only illuminates strongly the road of travel but also illuminates the margin of the sides of the road and a considerable portion beyond the same, which is a great advantage. When used as a flood light for illuminating the exterior of buildings or large signs, or flags, the light covers a wide field which gradually fades away from the central beam and thus, while showing the central portion of the object with great clearness also makes fairly visible the outlying portions of the object and thus avoids sharp shadows. This effect is not only useful by giving a fair view of an extended object, but has also the esthetic value of preventing the abrupt transition from light to comparative darkness of different portions of a large building, a wide scenery or other object of flood light illumination. No particular manner of seating the lens against the reflector mouth is indicated in the drawing, because this may be done in a great variety of ways and a particular manner of doing it forms no part of my invention.

What I claim as new and desire to secure by Letters Patent of the United States, is:—

1. In a headlight, a source of light, and means comprising a reflector and a condensing lens for sending the direct rays of light into the field in a beam of parallel rays and the reflected rays in a beam the rays of which converge and then diverge.

2. In a headlight, a parabolic reflector, a source of light located substantially at the focus thereof, and a condensing lens at the mouth of the reflector for refracting the direct rays of light into a beam of parallel rays and the reflected rays into a beam the rays of which converge and then diverge.

3. A headlight comprising a parabolic reflector and a condensing lens covering the mouth of the reflector, the axes of the lens and reflector coinciding and one of the foci of the lens coinciding with the focus of the reflector, and a source of light in the common focus.

4. In a headlight the combination of a parabolic reflector and a Fresnel lens covering the mouth of the reflector, these two parts having a common focus and a source of light in this common focus.

In witness whereof, I have hereunto set my hand this eleventh day of May, 1916.

PERCY S. BAILEY.